June 9, 1925.

L. C. COLE 1,541,118

LOADING AND UNLOADING MEANS FOR AXLE LATHES

Filed June 11, 1924 2 Sheets-Sheet 1

INVENTOR
L. C. Cole.
BY
Joseph K. Schofield
ATTORNEY

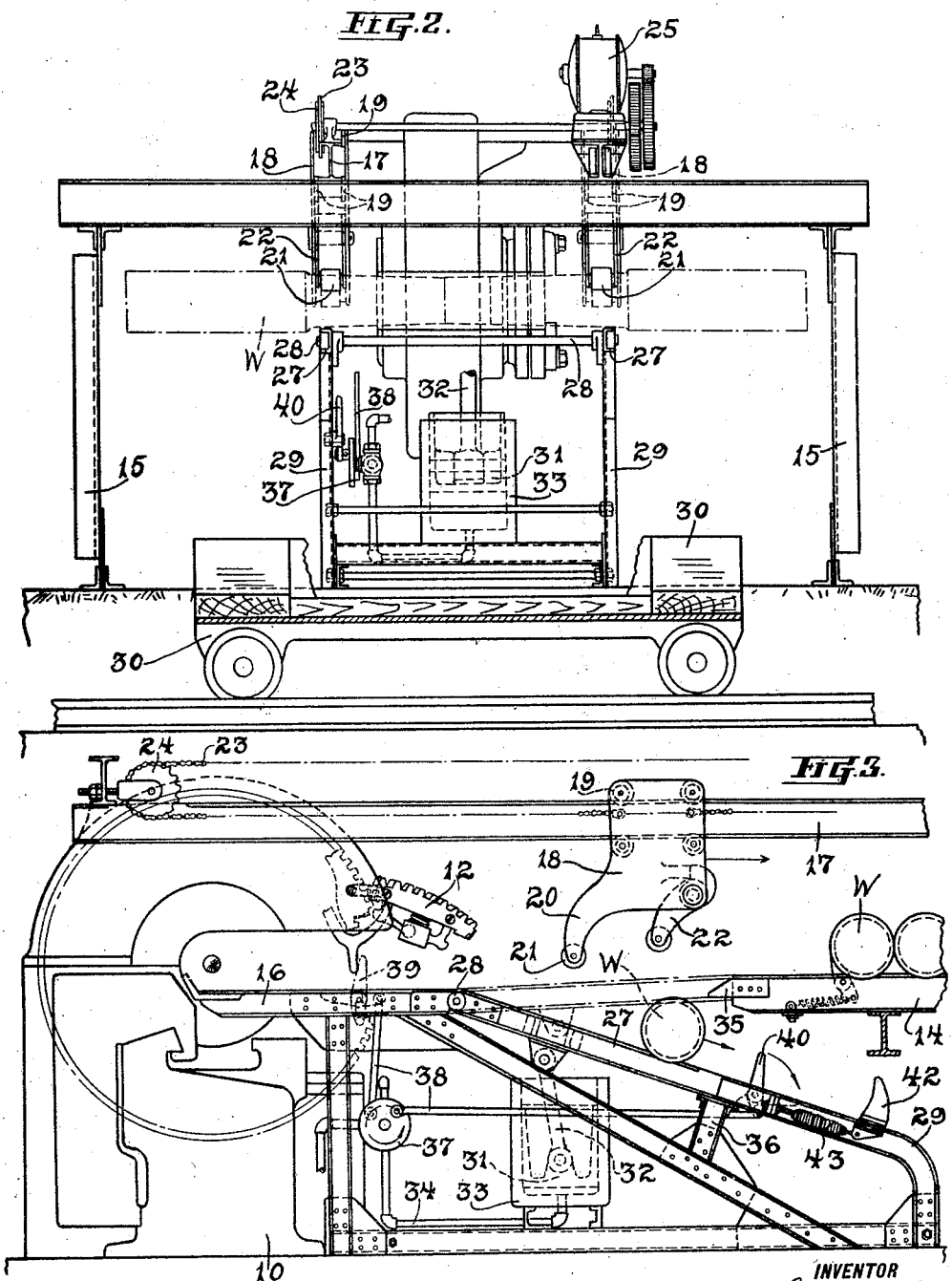

Patented June 9, 1925.

1,541,118

UNITED STATES PATENT OFFICE.

LYNDON C. COLE, OF HAMILTON, OHIO.

LOADING AND UNLOADING MEANS FOR AXLE LATHES.

Application filed June 11, 1924. Serial No. 719,365.

*To all whom it may concern:*

Be it known that I, LYNDON C. COLE, a citizen of the United States, residing at Hamilton, in the county of Butler and State of Ohio, have invented certain new and useful Improvements in Loading and Unloading Means for Axle Lathes, of which the following is a specification.

This invention relates to a lathe for turning large cylindrical bodies such as railway car-wheel axles, etc. Primarily, the invention enables blanks to be mechanically handled while being supplied to and after being operated upon by the lathe or other machine.

It is a principal object of the invention to provide transferring mechanism for advancing blanks to operative position in the lathe, or other machine, and to provide means for withdrawing them from the lathe after being operated on to another position whereby they may be conveniently handled with a minimum of time and manual labor.

It is another object of the invention to provide loading and unloading means for lathes so mounted that the blanks may be advanced to the machine on one level and removed therefrom to another and preferably lower level.

A further object of the invention is to provide controlling means for a valve operating a part of the transferring means so that the blank will be properly guided and the tracks forming a part of the guiding mechanism properly positioned for movement of the blank into the machine or away from the machine.

Another object of the invention is to operate this valve for controlling the guiding means for the blanks by movement of the blanks over portions of the tracks.

Another object of the invention is to provide a resiliently acting member to retard the downward movement of the blank upon leaving the machine.

With the above and other objects in view, my invention consists in the features of construction and operation set forth in the following specification and illustrated in the accompanying drawings.

In the accompanying drawings annexed hereto and forming a part of this specification, I have shown my invention embodied in connection with a machine for turning car-wheel axles but it will be understood that the invention can be otherwise embodied and that the drawings are not to be construed as defining or limiting the scope of the invention, the claims appended to this specification being relied upon for that purpose.

In the drawings:

Fig. 2 is an end elevation of the same, and

Fig. 3 is a partial side elevation with the parts in another operative position.

Figure 1:
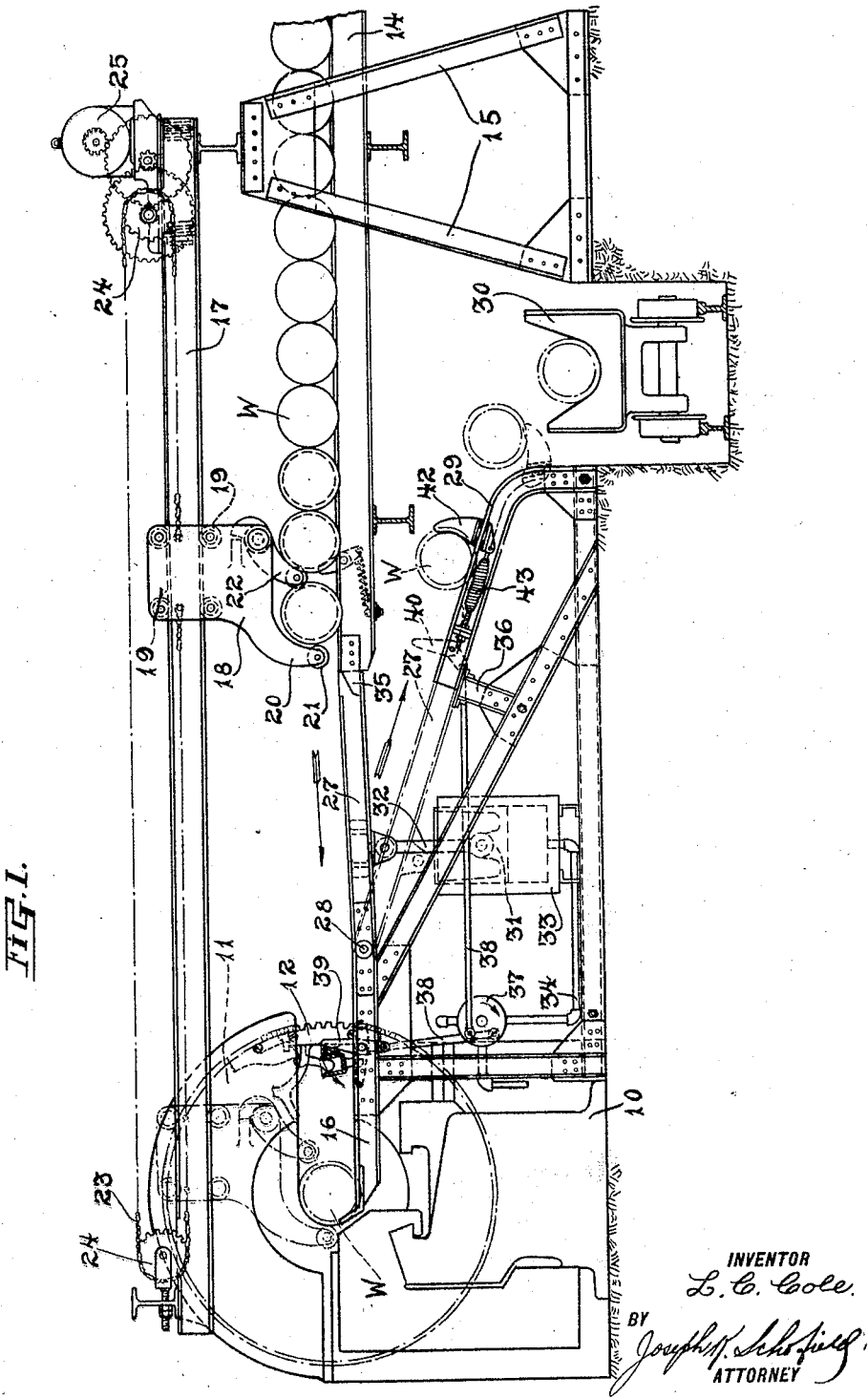
Figure 1 is a side elevation of the complete blank transferring means.

In the above mentioned drawings, I have shown but one embodiment of the invention which is now deemed preferable, but it is to be understood that changes and modifications may be made within the scope of the appended claims without departing from the spirit of the invention.

Briefly, and in its broadest aspect, my invention comprises the following principal parts: first, a lathe, or other machine tool, adapted to perform cutting operations upon large forgings or cylindrical blanks, the machine being so arranged that the blanks may be admitted sideways thereto from a point in rear of the machine; second, an elevated platform on which the blanks to be operated on may be arranged preparatory to being advanced to the machine; third, tracks extending from the platform so that the blanks may be guided and supported to operative position in the machine; fourth, means for positively advancing the blanks to the machine one at a time; fifth, tracks extending from an intermediate point of the mechanism and below the first mentioned tracks to deliver the finished blanks to a delivery truck or other suitable conveying means for the blanks; sixth, a movable or switch member forming a part of the guiding tracks which may be positioned to connect either the platform or delivery tracks with the tracks leading to the operative position on the lathe; and seventh, means to control the position of the switch or movable track by movement of the blanks over portions of the tracks.

Referring more in detail to the figures of the drawings, I provide a lathe 10 adapted for operating upon railway wheel axles having a cylindrical driving member in the form of a gear 11, a segment 12 of which may be removed to admit the work blank. It is obvious, however, that the particular type of lathe, or other machine, is independent of the present invention and any machine tool may be utilized appropriate for the operation to be carried out. It preferably should however have the blanks to be operated on advanced to the machine from a position in rear thereof and also advanced sideways to the operative work supporting and rotating position of the machine.

In order to support a large number of unfinished blanks W preparatory to be operated on, a platform 14 is erected some distance in rear of the machine 10, this being shown as made of structural steel suitably supported by means of the frame 15 shown in Fig. 1. Directly in rear of the machine are tracks 16 so that the blanks W may be guided directly to the work supporting and rotating means on the machine.

Directly above this platform 14 and the tracks 16 and extending to the machine is a support 17 for a carrier 18 shown in Fig. 1 which is adapted to be moved thereon by rollers 19 provided on the carrier 18. This carrier 18 is provided with a fixed depending arm 20 on which is a roller 21 which may bear against a blank W. Another depending arm 22 is suitably mounted on the carrier 18 so that it will advance the blank W in a direction to force it toward the machine 10 but will permit the arm 22 to be oscillated to pass over and thus grasp one of the blanks W. In order to actuate this carrier 18, an endless sprocket chain 23 is provided passing over suitable sprocket wheels 24 at opposite ends of its support 17. This sprocket chain 23 is moved in either direction by suitable rotation of a motor 25 supported on the frame or support 17.

It will be seen from the above described mechanism that, by moving the carrier 18 to the right as seen in Fig. 1, the depending arm 22 will pass over one of the blanks W and then moving the carrier 18 to the left by proper movement of the endless chain 23 will cause the roller 21 on the depending arm 22 to urge the blank W toward the machine. Movement of this carrier 18 moves the blank W to exactly its operative position in alignment with the work supporting and rotating means (not shown) on the lathe 10. Preferably, and as indicated in Fig. 2, there are, in the preferred embodiment of the invention illustrated, two endless chains and two carriers each supported on separated supports 17, these supports 17 being spaced sufficiently to grasp the particular blanks being operated on at points intermediate their length and guide them at all times during their movement from the platform 14 to their operative position in the lathe 10.

One portion 27 of the tracks above defined and extending between the platform 14 and the tracks 16 is hinged at the point or axis 28 as shown clearly in Fig. 1 so that it may be oscillated to an upper or lower position about an intermediate point in the fixed tracks 16, the lower position being indicated in dot and dash lines of Fig. 1. In the lower position of this track or switch member 27, the free ends of the tracks are placed in alignment with other tracks 29 directly below a portion of the platform 14 and adapted to carry the finished blank W to a position where it may be dropped onto a truck 30 or other carrier to convey it to any desired position.

In order to oscillate this movable track 27, to its two positions, I provide a piston 31 connected to an intermediate portion of the track 27 by means of a connecting rod 32. This piston 31 is movable within a cylinder 33 into which compressed air, or other fluid may be admitted as through a conduit 34. With the piston 31 held to its upper position by admitting compressed air to the lower end of the cylinder 33, the hinged track 27 is moved to its upper position, but, when it is desired to withdraw a finished blank W from the machine 10, the fluid is exhausted from the cylinder 33 thus permitting the track 27 to drop to its lower position. To prevent the track 27 from being moved to a position so that it will not align itself with the platform 14, I place extensions 35 on the platform 14 which may be engaged by the flanges of the tracks 27. To support the free end of the track 27 while in its lowered position, it may rest on a support 36.

To control the movements of this piston 31, a valve 37 is provided, this valve being of the three-way type so that air may be admitted to and exhausted from the cylinder 33 through conduit 34 by moving the valve 37 to different positions. To automatically control the movements of the valve 36, it is connected by suitable links 38 to actuating triggers 39 and 40 standing between portions of the fixed tracks 16 and 29 for the unfinished and finished blanks respectively. With the track 27 in its elevated position, as shown in Fig. 1, the first trigger 39 is in its vertical position and is passed over by the unfinished blank W after passing the movable track 27 and just as it approaches the machine. This trigger 39 is thus oscillated to a horizontal position causing air to be exhausted from the cylinder 33. This permits movement of the piston 31 downward to cause the track 27 to move to its lower position and, as the finished blank W descends this inclined track, it passes over and depresses the second actuating trigger 40 which moves the valve 37 to a second operative position admitting air to the cylinder 33 again and thus elevating the tracks 27 to their original position. Movement of the second actuating trigger 40 to its horizontal position causes the first trigger 39 to be returned to its upper position by means of the valve actuating links 38. With the movable track 27 again in its elevated position, it is in position for another unfinished blank W to be admitted to the machine, and for the cycle of operations above defined to be repeated.

To prevent the finished blanks W rolling down the incline when the movable portion of the tracks is in its lowered position at too high a velocity, a movable abutment 42 is provided retained in its elevated position by a long spring or other resilient connection 43 fixed to the tracks 29. Movement of the finished blank W downward causes this abutment 42 to move down with it against the resiliency of the spring 43 to approximately the position shown in dot and dash lines in Fig. 1. From this position the blank W drops over onto the truck 30, or other conveying means, and the abutment 42 moves again to its original upper position.

While the operation of the transferring device may be understood from the foregoing description, a brief résumé will be given. Movement of the blank W toward the work supporting members of the lathe 10 takes place while the gap 12 in the driving member 11 is in its open position. This is clearly shown in Fig. 3. Movement of the blank W into position in the lathe automatically closes the gap 12 so that the work may be rotated. Also when the finished work W is being removed from the lathe, it automatically actuates the gap 12 so that it will open to an extent sufficient to permit the blank being rolled outward.

Movement of the blank to its operative position takes place with the actuating trigger 39 in its vertical position and movement of the blank W over this trigger causes it to be moved to its horizontal position. By movement of this trigger 39 and the linkage 38, by means of which it is connected to the valve, the second trigger 40 is moved to its operative or upper position. As soon, therefore, as the blank W is moved from the machine 10, it passes over the first trigger 39 without any movement therefore and, as soon as it leaves the movable track members 27, it strikes the second trigger 40 and moves it to its inoperative or lowered position. Movement of this second trigger 40 to this position through the linkage 38 returns the first trigger 39 to its operative or vertical position.

It will therefore be seen that movement of the blank W over fixed portions of the guiding and supporting means 16 and 29 and adjacent the movable member 27 of these guiding means serves to actuate the movable member 27 properly to carry out the cycle of operations for automatically handling the blank before and after it is operated on.

What I claim is:

1. Blank transferring means for machine tools comprising in combination, a loading platform, guiding means for transferring the work blanks from said platform to said machine, guiding and supporting means for the finished blanks, and means to move a portion of said guiding means to alignment with said platform or with said supporting means for the finished blanks.

2. Blank transferring means for machine tools comprising in combination, a loading platform, guiding means for transferring the work blanks from said platform to said machine, a carrier for positively moving said blanks, guiding and supporting means for the finished blanks, and means to move a portion of said guiding means to alignment with said platform or with said supporting means for said finished blanks.

3. Blank transferring means for machine tools comprising in combination, an elevated loading platform, guiding means for transferring the work blanks from said platform to said machine, a carrier for advancing said blanks to the tool, guiding and supporting means for the finished blanks, positioned below said platform, and means to move a portion of said guiding means to alignment with said platform or said delivery means.

4. Blank transferring means for machine tools comprising in combination, a loading platform, guiding means for transferring the work blanks from said platform to said machine, guiding and supporting means for the finished blanks, and pneumatic means to oscillate a hinged portion of said blank guiding and supporting means to alignment with said platform or said supporting means for the finished blanks.

5. Blank transferring means for machine tools comprising in combination, a loading platform, guiding means for transferring the work blanks from said platform to said machine, a carrier for positively moving said blanks toward and from the tool, guiding and supporting means for the finished blanks, and pneumatic means to oscillate a hinged portion of said blank guiding and supporting means to alignment with said platform or said supporting means for the finished blanks.

6. Blank transferring means for machine tools comprising in combination, a loading platform, guiding means for transferring the work blanks from said platform to said machine, a carrier for advancing said blanks, guiding and supporting means for the finished blanks below the said platform, and pneumatic means to oscillate a hinged portion of said blank guiding and supporting means to alignment with said platform or said supporting means for the finished blanks.

7. Blank transferring means for machine tools comprising in combination, a loading platform, guiding means for transferring the work blanks from said platform to said machine, guiding and supporting means for the finished blanks, means to move a portion of said guiding and supporting means to alignment with said platform or with said supporting means for the finished blanks, and means to control the movement of said movable part of the blank guiding and supporting means actuated by movement of the blanks over fixed portions of said supporting means.

8. Blank transferring means for machine tools comprising in combination, a loading platform, guiding means for transferring the work blanks from said platform to said machine, a carrier for positively moving said blanks toward and from the tool, guiding and supporting means for the finished blanks below said platform, means to move a portion of said guiding and supporting means to alignment with said platform or with said supporting means for the finished blanks, and means to control the movement of said movable part of the blank guiding and supporting means actuated by movement of the blanks over fixed portions of said means adjacent said hinged portion.

9. Blank transferring means for machine tools comprising in combination, a loading platform, guiding means for transferring the work blanks from said platform to said machine, a carrier for positively advancing said blanks, guiding and supporting means for the finished blanks below said platform, means to move a portion of said guiding and supporting means to alignment with said platform or with said supporting means for the finished blanks, and fluid pressure means to control the movement of said movable part of the blank guiding and supporting means, a valve to actuate said means, said valve being controlled by movement of the blanks over fixed portions of said means.

10. Blank transferring means for machine tools comprising in combination, a loading platform, guiding means for said blanks extending from said platform to a position for mounting the blanks in the machine, a hinged member forming a part of said guiding and supporting means, means to actuate said hinged portion so that it may be positioned to connect said platform with said machine or said machine with guiding and supporting means for the completed blanks, and pneumatic means actuated by movement of the blanks over said supporting means to actuate said hinged member, said means being actuated by said blanks at two spaced positions.

11. Blank transferring means for machine tools comprising in combination, a loading platform, guiding means for said blanks extending from said platform to a position for mounting the blanks in the tool, means to positively advance said blanks from said platform to said position in the machine, a hinged member forming a part of said guiding and supporting means, means to retain said hinged member in position for advancing said blanks to said tool, means to lower said hinged member to permit blanks to be moved from said tool, a cylinder, a piston therein, movement thereof serving to move said hinged member, and means actuated by said blanks to raise or lower said piston and move said hinged member.

In testimony whereof, I hereto affix my signature.

LYNDON C. COLE.